(12) United States Patent
Boriack et al.

(10) Patent No.: US 10,426,075 B2
(45) Date of Patent: Oct. 1, 2019

(54) MOUNTED FRONT FOLD AGRICULTURAL TOOLBAR

(71) Applicant: CNH Industrial America LLC, New Holland, PA (US)

(72) Inventors: Cale N. Boriack, Lititz, PA (US); Buweneke A. Fernando, Ann Arbor, MI (US)

(73) Assignee: CNH Industrial America LLC, New Holland, PA (US)

(*) Notice: Subject to any disclaimer, the term of this patent is extended or adjusted under 35 U.S.C. 154(b) by 76 days.

(21) Appl. No.: 15/657,703

(22) Filed: Jul. 24, 2017

(65) Prior Publication Data
US 2019/0021213 A1 Jan. 24, 2019

(51) Int. Cl.
| | |
|---|---|
| A01B 73/06 | (2006.01) |
| A01B 49/06 | (2006.01) |
| A01C 5/06 | (2006.01) |
| A01C 23/00 | (2006.01) |
| A01C 7/08 | (2006.01) |
| A01C 7/20 | (2006.01) |

(52) U.S. Cl.
CPC .......... *A01B 73/065* (2013.01); *A01B 49/06* (2013.01); *A01C 5/062* (2013.01); *A01C 7/08* (2013.01); *A01C 7/208* (2013.01); *A01C 23/00* (2013.01)

(58) Field of Classification Search
CPC ............................................ A01B 73/06–067
See application file for complete search history.

(56) References Cited

U.S. PATENT DOCUMENTS

| | | | | |
|---|---|---|---|---|
| 5,113,956 A | * | 5/1992 | Friesen | A01B 73/065 172/311 |
| 5,291,954 A | * | 3/1994 | Kirwan | A01B 73/065 172/273 |
| 9,320,190 B2 | * | 4/2016 | Sauder | A01B 63/145 |
| 9,474,199 B2 | | 10/2016 | Sudbrink et al. | |
| 9,474,200 B2 | * | 10/2016 | Koch | A01B 76/00 |
| 2014/0124225 A1 | * | 5/2014 | Sauder | A01B 63/145 172/1 |
| 2014/0379230 A1 | * | 12/2014 | Koch | A01B 73/065 701/50 |
| 2016/0234993 A1 | * | 8/2016 | Sauder | A01B 63/145 |
| 2016/0338257 A1 | * | 11/2016 | Sauder | A01C 7/203 |

FOREIGN PATENT DOCUMENTS

WO 2013/112929 A3 8/2013

* cited by examiner

*Primary Examiner* — Matthew Troutman
(74) *Attorney, Agent, or Firm* — Rebecca L. Henkel; Rickard K. DeMille

(57) ABSTRACT

An agricultural implement which can be configured in a work position and a transport position. The agricultural implement includes a center frame defining a frame axis. The agricultural implement also includes a left toolbar and a right toolbar respectively pivotally connected to the center frame. The agricultural implement also includes a left draft tube and a right draft tube respectively pivotally connected to the left and right toolbars. In the work position the left draft tube is pivotally folded relative to the left toolbar and in the transport position the left draft tube is pivotally unfolded relative to the left toolbar. In the work position the right draft tube is pivotally folded relative to the right toolbar and in the transport position the right draft tube is pivotally unfolded relative to the right toolbar.

18 Claims, 5 Drawing Sheets

MOUNTED FRONT FOLD AGRICULTURAL TOOLBAR

BACKGROUND OF THE INVENTION

1. Field of the Invention

The present invention relates to agricultural implements, and, more particularly, to agricultural implements with folding toolbars.

2. Description of the Related Art

Agricultural planting implements, which are towed by a tractor or other work vehicle, are commonly used to plant rows of seeds in soil. Typically, modern planting implements may include a chassis that carries one or more main seed hoppers that provide seed through an air stream to multiple auxiliary seed hoppers that are associated with one or more seed dispensing row units, which are distributed across the width of the implement. A pneumatic system carried by the chassis may supply positive or negative pressurized air to transport the seeds or other particulate from the storage tanks to the row units. The row units may respectively open a trench in the field, deposit seeds via a metering device, close the trench, and pack soil onto the seed in order to efficiently plant numerous rows of seeds.

As modern planting implements are becoming larger and larger, many planting implements include convertible frames such that they can be pivoted, folded, or stacked in between a working position and a transport position. Pivoting planters may have a telescoping hitch assembly which extends outwardly as the entire toolbar frame rotates about a centrally located pivot axis in order have the length of the planter be parallel with the direction of travel. Folding planters may forwardly and/or rearwardly fold one or more wing frame members to minimize the lateral width of the planter. Stacking planters may include a center frame and a pair of foldable wing portions which vertically stack above the center frame.

The configuration of a planter may be dictated by various design constraints such as planting width, ease of conversion, certain transportation requirements, etc. Folding and pivot planters may have the advantage of a greater planting width while being narrow for transportation purposes; however, the distance between the planter and the tractor may be undesirable in certain field conditions. Stackable planters, and even some rigidly mounted planters, may be too wide for transportation purposes, and further may not be capable of accommodating larger row units and/or wider spacing in between row units.

What is needed in the art is an agricultural planter that more efficiently balances various field requirements with transportation parameters.

SUMMARY OF THE INVENTION

The present invention provides an agricultural implement with a front-folding toolbar, which is compact in the working position and narrow in the transport position.

The invention in one form is directed to an agricultural implement which can be configured in a work position or a transport position. The agricultural implement includes a center frame defining a frame axis and having a first end and a second end. The second end is configured for mounting at least one wheel. The agricultural implement also includes a left toolbar having a proximal end and a distal end. The proximal end of the left toolbar is pivotally connected to the first end of the center frame at a left pivot axis. The left toolbar defines a left toolbar axis which is substantially transverse to the frame axis in the work position and substantially parallel to the frame axis in the transport position. The agricultural implement also includes a right toolbar having a proximal end and a distal end. The proximal end of the right toolbar is pivotally connected to the first end of the center frame at a right pivot axis. The right toolbar defines a right toolbar axis which is substantially transverse to the frame axis in the work position and substantially parallel to the frame axis in the transport position. The agricultural implement also includes a left draft tube having a proximal end and a distal end that is pivotally connected to the distal end of the left toolbar. The left draft tube defines a left draft tube axis which is substantially parallel to the left toolbar axis in the work position and in the transport position such that in the work position the left draft tube is pivotally folded relative to the left toolbar and in the transport position the left draft tube is pivotally unfolded relative to the left toolbar. The agricultural implement also includes a right draft tube having a proximal end and a distal end that is pivotally connected to the distal end of the right toolbar. The right draft tube defines a right draft tube axis which is substantially parallel to the right toolbar axis in the work position and in the transport position such that in the work position the right draft tube is pivotally folded relative to the right toolbar and in the transport position the right draft tube is pivotally unfolded relative to the right toolbar.

The invention in another form is directed to an agricultural implement which can be configured in a work position or a transport position. The agricultural implement includes a center frame having a first end and a second end. The second end is configured for mounting at least one wheel. The agricultural implement also includes a stacking toolbar assembly. The stacking toolbar assembly includes a left toolbar having a proximal end and a distal end. The proximal end of the left toolbar is pivotally connected to the first end of the center frame at a left pivot axis. The left toolbar defines a left toolbar axis which is substantially transverse to the frame axis in the work position and substantially parallel to the frame axis in the transport position. The stacking toolbar assembly also includes a right toolbar having a proximal end and a distal end. The proximal end of the right toolbar is pivotally connected to the first end of the center frame at a right pivot axis. The right toolbar defines a right toolbar axis which is substantially transverse to the frame axis in the work position and substantially parallel to the frame axis in the transport position. The stacking toolbar assembly also includes a stacking left wing toolbar moveably coupled to the left toolbar and a stacking right wing toolbar moveably coupled to the right toolbar. The agricultural implement also includes a left draft tube having a proximal end and a distal end that is pivotally connected to the distal end of the left toolbar. The left draft tube defines a left draft tube axis which is substantially parallel to the left toolbar axis in the work position and in the transport position such that in the work position the left draft tube is pivotally folded relative to the left toolbar and in the transport position the left draft tube is pivotally unfolded relative to the left toolbar. The agricultural implement also includes a right draft tube having a proximal end and a distal end that is pivotally connected to the distal end of the right toolbar. The right draft tube defines a right draft tube axis which is substantially parallel to the right toolbar axis in the work position and in the transport position such that in the work position the right draft tube is pivotally folded relative to the right toolbar and in the transport position the right draft tube is pivotally unfolded relative to the right toolbar.

An advantage of the present invention is that the agricultural implement is compact in the work position and narrow in the transport position.

Another advantage of the present invention is that the agricultural implement reduces costs and manufacturing complexity.

Yet a further advantage of the present invention is that the draft tubes of the agricultural implement may be coupled to the agricultural vehicle such that the agricultural implement operates as a mounted agricultural implement in the work position and a semi-mounted trailing agricultural implement in the transport position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
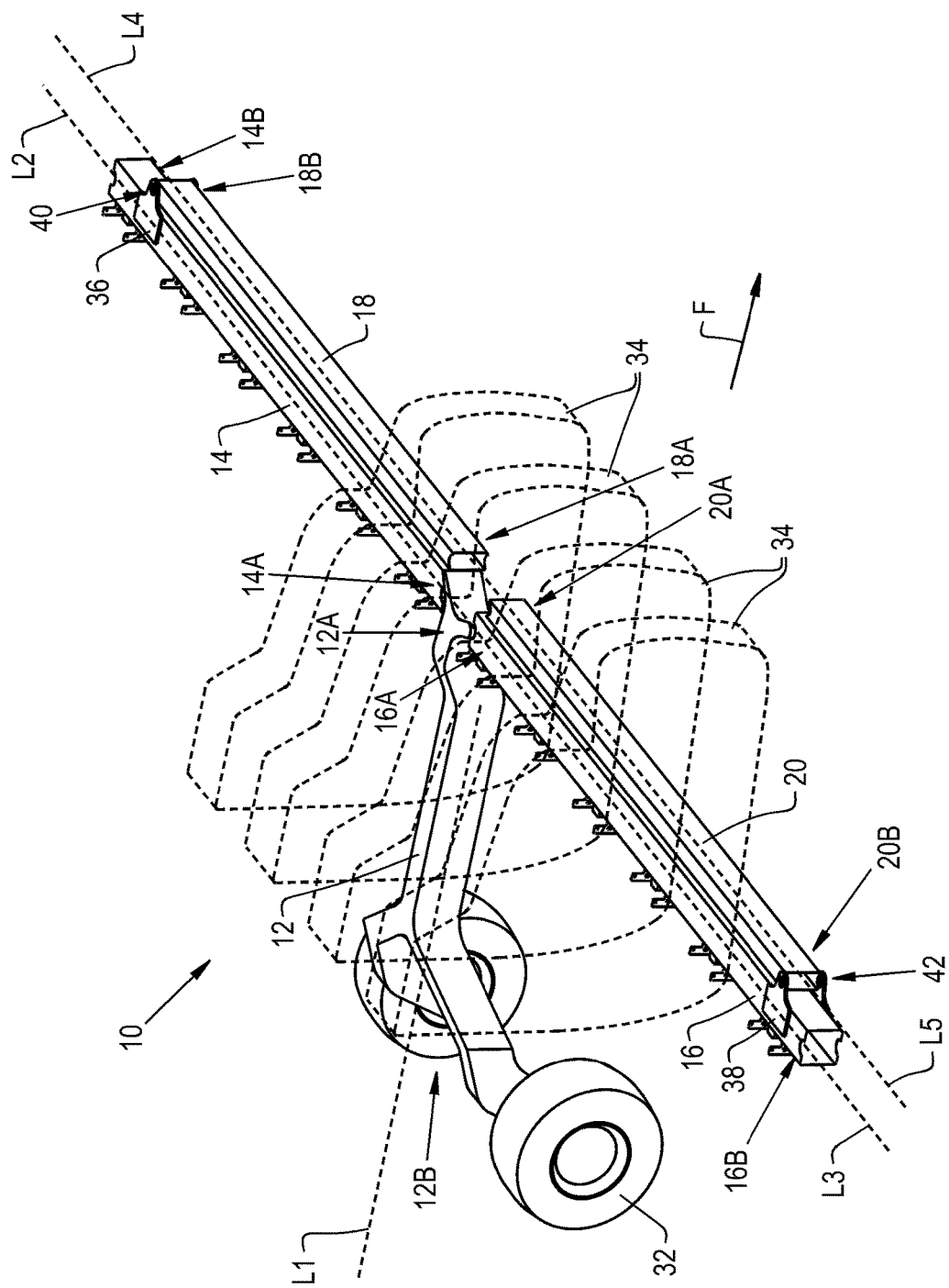
FIG. 1 is a perspective view of an agricultural implement according to the present invention.
Figure 2:
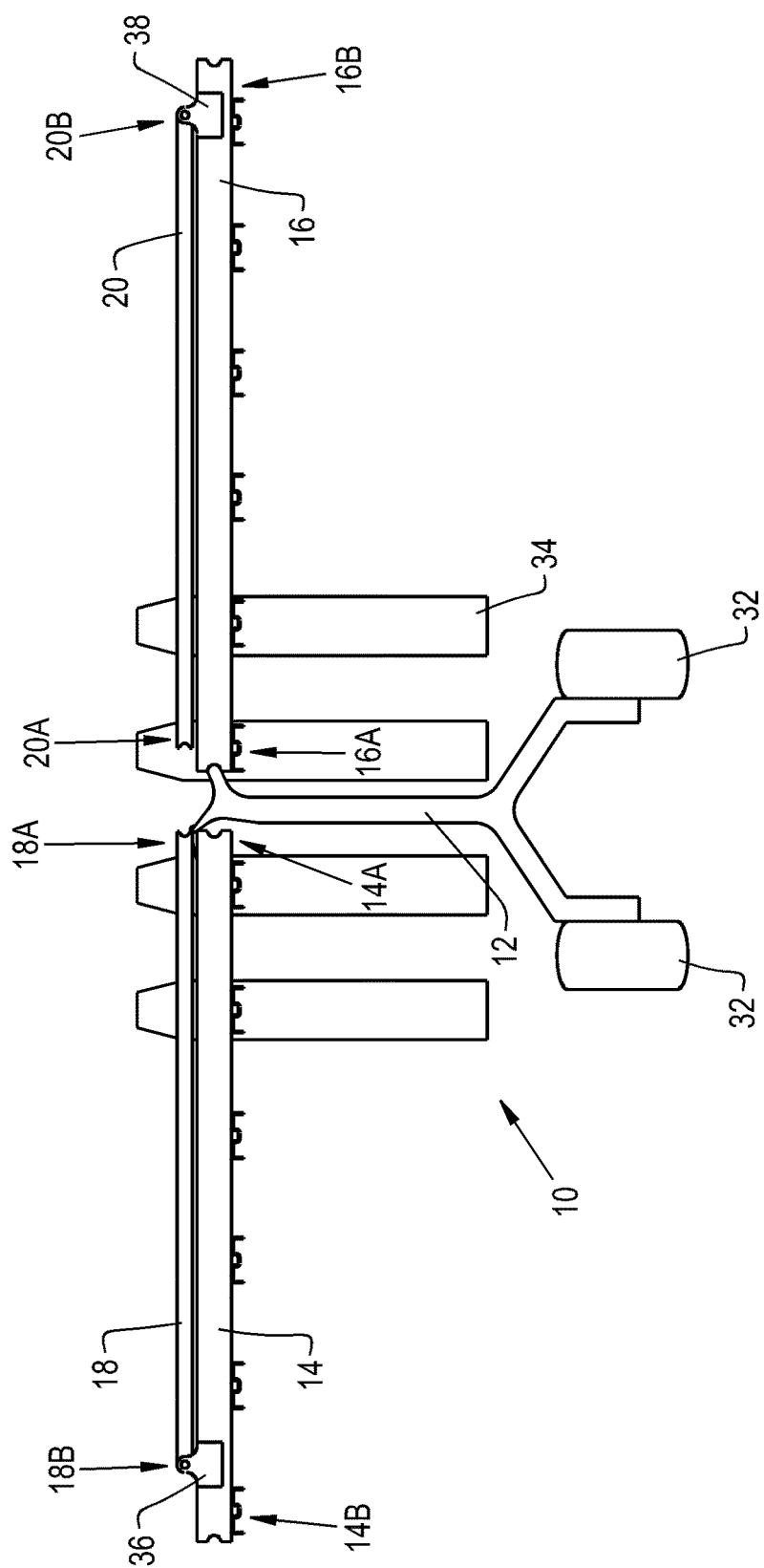
FIG. 2 is a top view of the agricultural implement as shown in FIG. 1.
Figure 3:
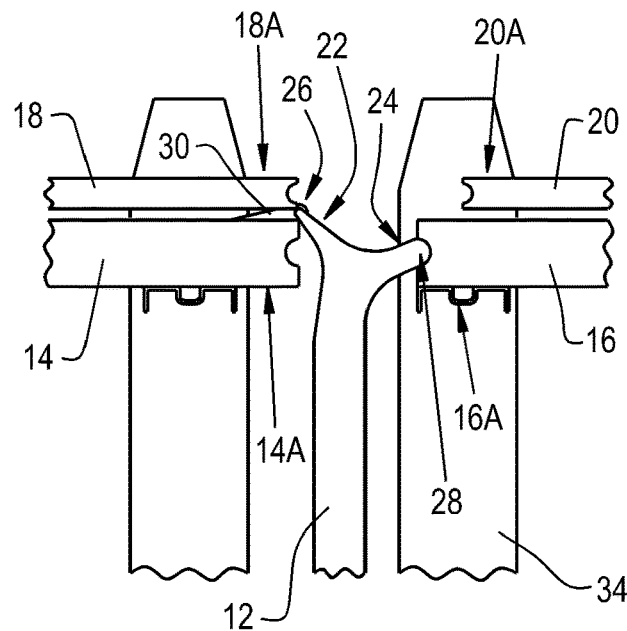
FIG. 3 is a top view of the center frame of the agricultural implement as shown in FIGS. 1-2.

Referring now to the drawings, and more particularly to FIGS. 1-3, there is shown an agricultural implement 10 according to the present invention that may be moveable in between a field-working (i.e., work) position and a transport position. The agricultural implement 10 is shown to be in the form of a planting implement; however, the agricultural implement 10 may be in the form of various agricultural implements including a tillage implement, a soil conditioner, a fertilizer or chemical application implement, a seeder, or a combination thereof. The planting implement 10 generally includes a center frame 12, left and right toolbars 14, 16 pivotally connected to the center frame 12, and left and right draft tubes 18, 20 pivotally connected to the left and right toolbars 14, 16. The planting implement 10 may be pulled by a tractor or other agricultural vehicle across a field in a direction of travel "F". In the work position, the planting implement 10 may operate as a mounted planting implement (e.g., fully lifted and supported by a tractor), and in the transport position the planting implement 10 may operate as a semi-mounted trailing (e.g., like a drawbar hitch).

Figure 7:
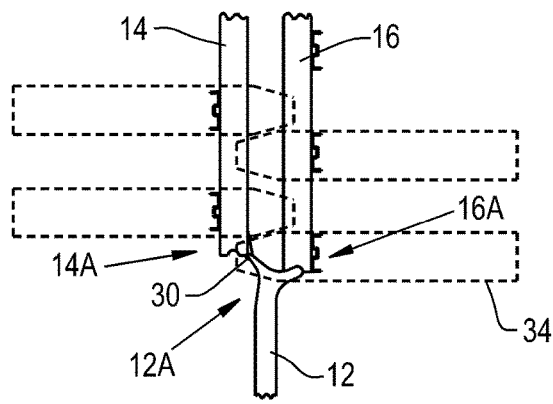
FIG. 7 is a top view of the center frame of the agricultural implement according to the present invention in the transport position as shown in FIG. 6.

The center frame 12 has a first end 12A and a second end 12B disposed rearwardly of the first end 12A. The center frame 12 also defines a frame axis L1. The center frame 12 may be in the form of an elongated frame which may have an upwardly bent front end 12A and a downwardly bent rear end 12B. The center frame 12 may be composed of any suitable material such as a metal, metal alloy, or polymer. The front end 12A is configured to pivotally connect the left and right toolbars 14, 16 at pivot joints 22, 24, which respectively define pivot axes 26, 28. The first end 12A of the center frame 12 may have a "T" or "Y" configuration such that the toolbars 12, 16 are respectively connected to the center frame 12 at a distance away from the center longitudinal axis of the center frame 12. As shown in FIG. 3, the axes 26, 28 may be offset from one another such that the left axis 26 is located in front of (i.e. before) the right axis 28 when viewed in the direction of travel F, which reduces the width of the planting implement 10 in the transport position (FIG. 7). In this regard, the toolbars 14, 16 may be laterally aligned or they may be located laterally offset. It should be appreciated that the right axis 28 of the right toolbar 16 may be offset instead of the left axis 26 of the left toolbar 14. If the axes 26, 28 are offset from one another, the center frame 12 may further include an additional link 30 that couples one of the toolbars 14, 16, for example the left toolbar 14, to the center frame 12 (FIG. 3). The additional link 30 ensures that the toolbars 12, 16 can be laterally aligned to evenly plant rows of seeds. The additional link 30 may be composed of a different material or the same material as the center frame 12. It should be appreciated that one or more additional links 30 of various sizes may be used to couple one or both of the toolbars 14, 16 to the center frame 12. The second end 12B of the center frame 12 is configured to mount at least one wheel. For example, the second end 12B of the center frame 12 may mount a wheel assembly that includes a pair of wheels 32. The wheels 32 may be configured to caster in the work position and be locked straight in the transport position. In order to lock and unlock the wheels 32, the wheels 32 may include a lock assembly with a locking pin such as disclosed in U.S. Pat. No. 9,474,199, owned by CNH Industrial, LLC., which is incorporated herein by reference. The wheel assembly may also include actuators and various other components in order to be capable of lift assist and various bulk fill functions such as in the EARLY RISER® series planters available from Case IH, LLC.

The toolbars 14, 16 respectively define axes L2, L3 and include a proximal and distal end 14A, 14B and 16A, 16B. The respective proximal ends 14A, 16A are pivotally coupled to the first end 12A of the center frame 12. The toolbars 14, 16 respectively pivot about the axes 26, 28 in order to forwardly fold into the transport position. The toolbars 14, 16 may be composed of any suitable material such as a metal, an alloy, a polymer, etc. The toolbars 14, 16 may be in the form of solid or hollow beams that provide support for the various components and ground engaging tools which are affixed thereto. For example, row units 34, which facilitate the planting of the rows of seeds, may be mounted to the toolbars 14, 16 at equally spaced intervals.

The row units 34 may deposit the seeds by vacuum pressure, which enables the row units 34 to control the seed flow rate and the spacing between the seeds as they are planted. The row units 34 may include gauge wheels, openers to cut a furrow in the field, and seed boxes which receive seeds from a central bulk assembly (not shown). The planting implement 10 may also include an air pressure differential system, an air compressor system, and an electric generator (not shown). The planting implement 10 may also include various hoses and/or conduits to transport the seeds and various hydraulic, pneumatic, and electrical lines to support various cylinders and systems that may be included on the planting implement 10.

The left and right draft tubes 18, 20 each define axes L4, L5 and include a proximal end and a distal end 18A, 18B and 20A, 20B. The axes L4, L5 of the draft tubes 18, 20 are substantially coaxial. The respective proximal ends 18A, 20A of the draft tubes 18, 20 are not pivotally affixed to the center frame 12. The respective distal ends 18B, 20B of the draft tubes 18, 20 may be respectively connected in between the proximal ends 14A, 16A and distal ends 14B, 16B of the toolbars 14, 16. For example, the draft tubes 18, 20 may be respectively pivotally connected by mounts 36, 38 to the left and right toolbars 14, 16 at pivot axes 40, 42 adjacent to the distal ends 18B, 20B of the draft tubes 18, 20 and the distal ends of the toolbars 14B, 16B (FIG. 1). The draft tubes 18, 20 may extend along the full length of toolbars 14, 16 or extend along a substantial portion of each toolbar 14, 16. Thereby, the draft tubes 18, 20 may be approximately the same length of the toolbars 14, 16. The draft tubes 18, 20 may be composed of any suitable material such as a metal, an alloy, a polymer, etc. The draft tubes 18, 20 may be in the form of solid or hollow beams. As shown, the draft tubes 18, 20 are in the form of hollow, rectangular beams; however, the draft tubes 18, 20 may be solid and/or have any desired shape such as square, circular, ellipsoidal, etc. The proximal ends 18A, 20A of the draft tubes 18, 20 are configured to couple to the tractor or other agricultural vehicle. The proximal ends 18A, 20A may each include a hitch or hitch assembly that couples to the tractor. For example, the draft tubes 18, 20 may couple to the three-point hitch of the tractor (not shown). Thereby, only the draft tubes 18, 20 may be coupled to the tractor and not the center frame 12 or the toolbars 14, 16.

Figure 4:
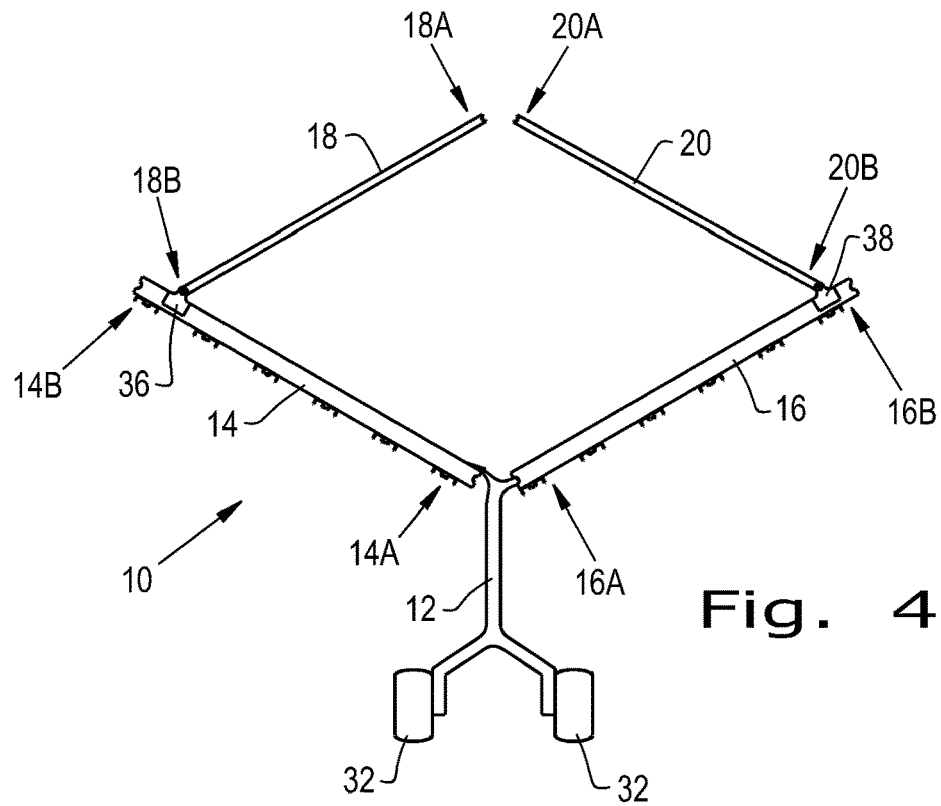
FIG. 4 is a top view of the agricultural implement according to the present invention in a partially folded state.
Figure 5:
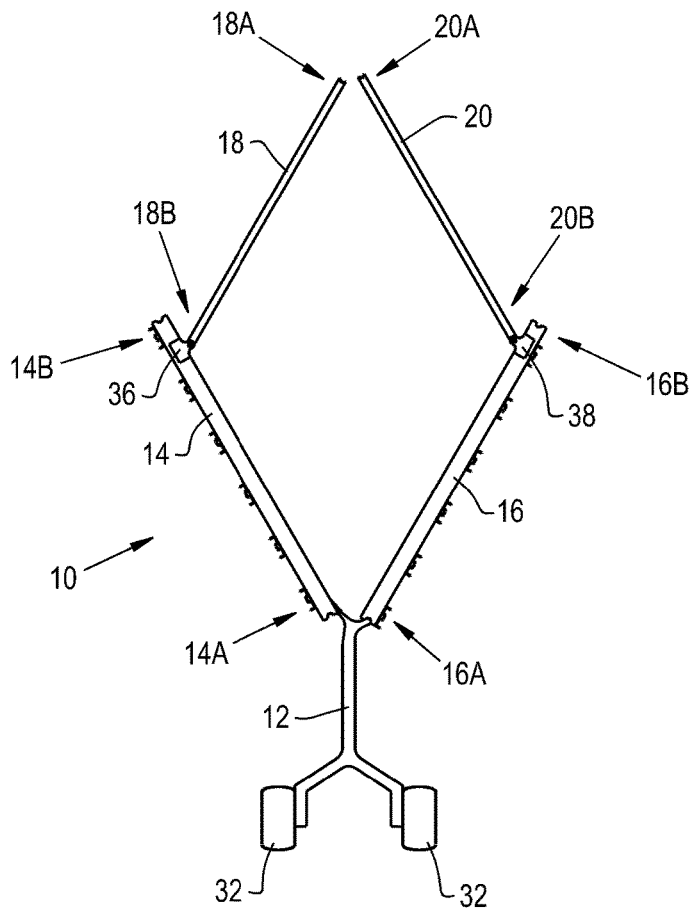
FIG. 5 is a top view of the agricultural implement according to the present invention in another partially folded state.
Figure 6:
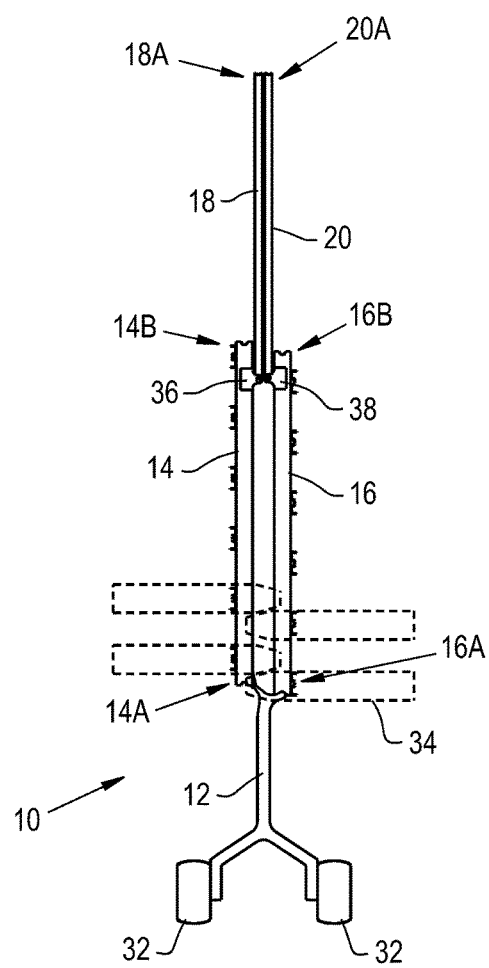
FIG. 6 is a top view of the agricultural implement according to the present invention in a transport position.

Referring now to FIG. 2 and FIGS. 4-7 collectively, there is shown the planting implement 10 in various stages between the unfolded, work position (FIG. 2) and the folded, transport position (FIG. 6). In the work position, the toolbars 14, 16 and the draft tubes 18, 20 are substantially transverse to the direction of travel F, as well as to the center frame axis L1. Further, the draft tubes 18, 20 are substantially parallel with the left and right toolbars 14, 16 such that an inner facing surface of the draft tubes 18, 20 faces and/or abuts against a correlative surface of the toolbars 14, 16. In other words, the draft tubes 18, 20 are folded relative to the toolbars 14, 16 in the work position. To fold the planting implement 10 into the transport position, a force is exerted on each left and right draft tube 18, 20 which moves the proximal ends 18A, 20A of the draft tubes 18, 20 forward and inward, and thereby the distal ends 18B, 20B move forward and inward. Given the pivotal attachment between the draft tubes 18, 20 and the toolbars 14, 16, as the distal ends 18B, 20B of the draft tubes 18, 20 move forward and inward, the distal ends 14B, 16B of the toolbars 14, 16 also move forward and inward (FIGS. 4 and 5). In the transport position, the draft tubes 18, 20 are again substantially parallel to the toolbars 14, 16 such that the draft tubes 18, 20 and toolbars 14, 16 are substantially parallel with the direction of travel F, as well as the center frame axis L1. In the transport position, the inner facing surfaces of each draft tube 18, 20 face each other such that the draft tubes 18, 20 are substantially inline with one another. Also, in the transport position, the correlative surfaces of the left and right toolbars 14, 16 face each other. In other words, the draft tubes 18, 20 are unfolded relative to the toolbars 14, 16 in the transport position. Further, the draft tubes 18, 20 may extend substantially in front of the toolbars 14, 16 and may only partially overlap with the toolbars 14, 16 near the respective ends 14B, 16B of the toolbars 14, 16. As shown in FIG. 6, and in detail in FIG. 7, the row units 34 may fit adjacent to one another in an interlocking manner so that a narrower width in the transport position may be achieved.

In order to fold and unfold the planting implement 10, the draft tubes 18, 20 may be moved by the forward or reward movement of the agricultural vehicle and/or by an actuating system that is operably coupled to the draft tubes 18, 20. The actuating system may include hydraulic or electric cylinders that move the draft tubes 18, 20. The left and right draft tubes 18, 20 may be selectively individually pivotable and/or synchronously pivotable between the work position and the transport position. The draft tubes 18, 20 may be individually folded or unfolded relative to the toolbars 14, 16 by the actuating system, or the draft tubes 18, 20 may be moved in unison by the actuating system and/or the agricultural vehicle.

It should be appreciated that the draft tubes 18, 20 may be selectively fixed relative to the toolbars 14, 16 such that the draft tubes 18, 20 are not capable of pivoting in the work position and/or the transport position until it is desired to move the draft tubes 18, 20. For example, planting implement 10 may include a locking feature that selectively locks the movement of the draft tubes 18, 20 relative to the toolbars 14, 16. The locking feature may include a clamp, a pin, a latch, a mounting bracket, etc., in order to affix the toolbars 14, 16 in the work position such that the forward movement of the tractor does not undesirably fold the planting implement 10.

It should also be appreciated that the planting implement 10 may include an electronic control unit (ECU) that provides command signals to automatically fold and unfold the planting implement 10. For example, the ECU may send a fold or unfold command to the actuating system as discussed above in order to control the operation of cylinders which cause the draft tubes 18, 20 to move, thereby causing the toolbars 14, 16 to fold or unfold. In this regard, an operator may input a control command to control the ECU to move the planting implement 10 between the field-working position (FIG. 2) and transport position (FIG. 6). The planting implement 10 may also include various position sensors located on the toolbars 14, 16 and/or draft tubes 18, 20 in order to provide position signals to the ECU. An ISOBUS connection may also be provided between the agricultural vehicle and the planting implement 10.

Figure 9:
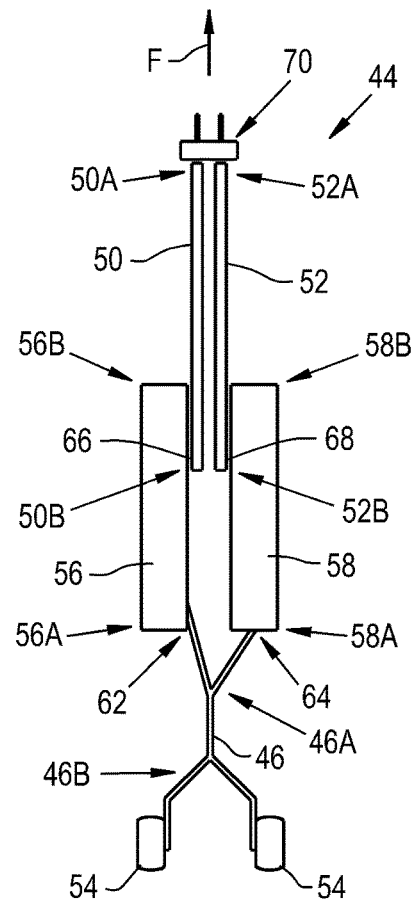
FIG. 9 is a top view of the agricultural implement as shown in FIG. 8.
Figure 8:
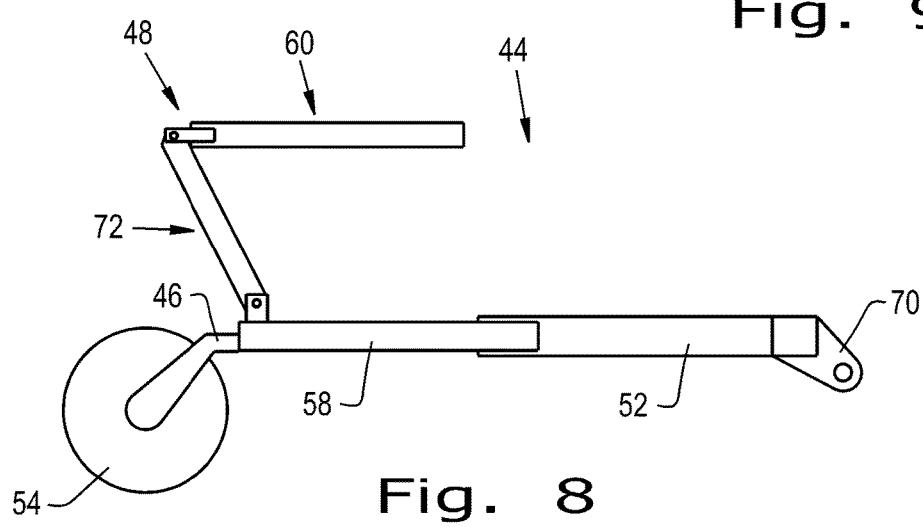
FIG. 8 is a side view of another embodiment of an agricultural implement according to the present invention.

Referring now to FIGS. 8-9, there is shown another embodiment of a planting implement according to the present invention in the form of a stacking planting implement 44. The stacking planting implement 44 generally includes a center frame 46, a stacking toolbar assembly 48 connected to the center frame 46, and left and right draft tubes 50, 52. The planting implement 44 may be pulled by a tractor or other agricultural vehicle across the field in a direction of travel "F" via a hitch 70. The planting implement 44 may be substantially similar to the planting implement 10 except that the planting implement 44 includes a stacking toolbar assembly 48 which reduces the length of the planting implement 44 in the transport position. As in the planting implement 10, the planting implement 44 may operate as a mounted planting implement (e.g., fully lifted and supported by a tractor) in the work position, and the planting implement 44 may operate as a semi-mounted trailing (e.g., like a drawbar hitch) in the transport position.

The center frame 46 may be designed as the center frame 12 as discussed above. Thereby, the center frame 46 may include a front end 46A configured to movably mount the stacking toolbar assembly 48 and a rear end 46B that is configured to mount wheels 54. The wheels 54 may be in the form of the wheels 32 as discussed above with respect to the planting implement 10.

The stacking toolbar assembly 48 may include left and right toolbars 56, 58 and a pair of stacking left and right wing toolbars 60 (only the stacking right wing toolbar is shown in FIG. 8), which are respectively moveably coupled to the left and right toolbars 56, 58. As shown in FIG. 9, the overall length of the planting implement 44 may be reduced in the transport position as a result of the stacking toolbar assembly 48. For clarity sake, FIG. 9 illustrates the planting implement 44 without the pair of wing toolbars 60. It should be appreciated that the stacking toolbar assembly 48 may provide a desired downforce on the planting implement 10.

The left and right toolbars 56, 58 may be designed as the left and right toolbars 14, 16, except that the toolbars 56, 58 have a shorter length. The left and right toolbars 56, 58 may each include a proximal end and a distal end 56A, 56B and 58A, 58B. The proximal ends 56A, 58A may be pivotally connected to the first end 46A of the center frame 46 at respective axes 62, 64 as discussed above. Thereby, the axes 62, 64 may be laterally aligned or offset from one another. The distal ends 56B, 58B may be respectively pivotally connected to the draft tubes 50, 52 at respective axes 66, 68.

The pair of wing toolbars 60 may be substantially laterally aligned with the toolbars 56, 58 in the work position and may be stacked above the toolbars 56, 58 in the transport position. The pair of wing toolbars 60 may also be configured to mount row units as the toolbars 56, 58. The pair of wing toolbars 60 may be composed of the same material as the toolbars 56, 58. The stacking toolbar assembly 48 may also include a pair of pivot arms 72, which each are pivotally coupled to the to the proximal ends 56A, 58A of the toolbars 56, 58 at one end, and are pivotally coupled at the other end to each stacking left and right wing toolbar 60. The stacking toolbar assembly 48 may also include known links, pivot arms, tensioning rods, mounts, and actuators to pivotally stack the pair of wing toolbars 60. For example, the stacking toolbar assembly 48 may include the various stack-folding components of the 1200 Series EARLY RISER® planters, such as the stacking hydraulic system of the 1235 Mounted Stacker planter from Case IH, LLC.

The left and right draft tubes 50, 52 may be designed as the left and right draft tubes 18, 20 as discussed above with respect to the planting implement 10. The draft tubes 50, 52 each have a proximal end and a distal end 50A, 50B and 52A, 52B. The proximal ends 50A, 52A are configured to connect to the agricultural vehicle by the hitch 70. The distal ends 50B, 52B of the draft tubes 50, 52 are pivotally connected to the distal ends 56B, 58B of the toolbars 56, 58 at the respective axes 66, 68.

The operation of the planting implement 44 may be substantially the same as the operation of the planting implement 10. To move the planting implement into the transport position, the stacking toolbar assembly 48 may initially stack the pair of wing toolbars 60. The proximal ends 50A, 52A of the left and right draft tubes 50, 52 may be moved forwardly and inwardly, which causes the left and right toolbars 56, 58 to move forwardly and inwardly. Hence, the entire stacking toolbar assembly 48 may pivot to be substantially parallel with draft tubes 50, 52 (FIG. 8). In other words, in the transport position, the draft tubes 50, 52, the toolbars 56, 58, and the pair of wing toolbars 60 may be substantially parallel to the direction of travel F. To unfold the planting implement 44 into the work position, the draft tubes 50, 52 may be moved rearwardly and outwardly such that the left and right toolbars 56, 58 are moved rearwardly and outwardly. The stacking toolbar assembly 48 may unstack the pair of stacking wing toolbars 60. In the work position, the draft tubes 50, 52 and the toolbars 56, 58, 60 of the stacking toolbar assembly 48 are substantially transverse to the direction of travel F.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement which can be configured in a work position or a transport position, comprising:
   a center frame defining a frame axis and having a first end and a second end, said second end configured for mounting at least one wheel;
   a left toolbar having a proximal end and a distal end, the proximal end of the left toolbar is pivotally connected to the first end of the center frame at a left pivot axis, said left toolbar defining a left toolbar axis which is substantially transverse to the frame axis in said work position and substantially parallel to the frame axis in said transport position;
   a right toolbar having a proximal end and a distal end, the proximal end of the right toolbar is pivotally connected to the first end of the center frame at a right pivot axis, said right toolbar defining a right toolbar axis which is substantially transverse to the frame axis in said work position and substantially parallel to the frame axis in said transport position, wherein said left pivot axis and said right pivot axis are located offset to one another such that said left pivot axis is positioned in front of said right pivot axis;
   a left draft tube having a proximal end and a distal end that is pivotally connected between the proximal end and the distal end of the left toolbar, said left draft tube defining a left draft tube axis which is substantially parallel to the left toolbar axis in said work position and in said transport position such that in said work position said left draft tube is pivotally folded relative to said left toolbar and in said transport position said left draft tube is pivotally unfolded relative to said left toolbar; and
   a right draft tube having a proximal end and a distal end that is pivotally connected between the proximal end and the distal end of the right toolbar, said right draft tube defining a right draft tube axis which is substantially parallel to the right toolbar axis in said work position and in said transport position such that in said work position said right draft tube is pivotally folded relative to said right toolbar and in said transport position said right draft tube is pivotally unfolded relative to said right toolbar.

2. The agricultural implement of claim 1, wherein in moving said agricultural implement into said transport position, said respective proximal ends of said left and right draft tubes move forwardly such that said left and right toolbars fold forwardly and inwardly.

3. The agricultural implement of claim 1, wherein said respective proximal ends of said left and right draft tubes are configured to couple to an agricultural vehicle.

4. The agricultural implement of claim 1, wherein said respective proximal ends of said left and right draft tubes are not pivotally affixed to said center frame.

5. The agricultural implement of claim 1, wherein said left and right draft tube axes are coaxial in the work position.

6. The agricultural implement of claim 1, wherein said left and right draft tubes are selectively at least one of individually pivotable and synchronously pivotable between the work position and the transport position.

7. The agricultural implement of claim 1, wherein in said work position, said agricultural implement operates in the field and in said transport position said agricultural implement is folded.

8. The agricultural implement of claim 1, wherein said at least one wheel is configured to caster in said work position and said at least one wheel is locked straight in said transport position.

9. The agricultural implement of claim 1, wherein the agricultural implement comprises at least one of a soil conditioner, a tillage implement, a fertilizer application implement, a planter, a seeder, and said left and right toolbars are configured to support a plurality of row units.

10. An agricultural implement which can be configured in a work position or a transport position, comprising:
  a center frame having a first end and a second end, said second end configured for mounting at least one wheel;
  a stacking toolbar assembly, including:
    a left toolbar having a proximal end and a distal end, said proximal end of the left toolbar is pivotally connected to the first end of the center frame at a left pivot axis, said left toolbar defining a left toolbar axis which is substantially transverse to said frame axis in said work position and substantially parallel to said frame axis in said transport position;
    a right toolbar having a proximal end and a distal end, said proximal end of the right toolbar is pivotally connected to the first end of the center frame at a right pivot axis, said right toolbar defining a right toolbar axis which is substantially transverse to said frame axis in said work position and substantially parallel to said frame axis in said transport position, wherein said left pivot axis and said right pivot axis are located offset to one another such that said left pivot axis is positioned in front of said right pivot axis;
    a stacking left wing toolbar moveably coupled to the left toolbar; and
    a stacking right wing toolbar moveably coupled to the right toolbar;
  a left draft tube having a proximal end and a distal end that is pivotally connected between the proximal end and the distal end of the left toolbar, said left draft tube defining a left draft tube axis which is substantially parallel to said left toolbar axis in said work position and in said transport position such that in said work position said left draft tube is pivotally folded relative to said left toolbar and in said transport position said left draft tube is pivotally unfolded relative to said left toolbar; and
  a right draft tube having a proximal end and a distal end that is pivotally connected between the proximal end and the distal end of the right toolbar, said right draft tube defining a right draft tube axis which is substantially parallel to said right toolbar axis in said work position and in said transport position such that in said work position said right draft tube is pivotally folded relative to said right toolbar and in said transport position said right draft tube is pivotally unfolded relative to said right toolbar.

11. The agricultural implement of claim 10, wherein in moving said agricultural implement into said transport position, said respective proximal ends of said left and right draft tubes move forwardly such that said left and right toolbars fold forwardly and inwardly.

12. The agricultural implement of claim 10, wherein said respective proximal ends of said left and right draft tubes each include a hitch that is configured to couple to an agricultural vehicle.

13. The agricultural implement of claim 10, wherein said respective proximal ends of said left and right draft tubes are not pivotally affixed to said center frame.

14. The agricultural implement of claim 10, wherein said left and right draft tube axes are coaxial.

15. The agricultural implement of claim 10, wherein said left and right draft tubes are selectively at least one of individually pivotable and synchronously pivotable between the work position and the transport position.

16. The agricultural implement of claim 10, wherein in said work position, said agricultural implement works in the field and in said transport position said agricultural implement is folded.

17. The agricultural implement of claim 10, wherein said at least one wheel is configured to caster in said work position and said at least one wheel is locked straight in said transport position.

18. The agricultural implement of claim 10, wherein the agricultural implement comprises at least one of a soil conditioner, a tillage implement, a fertilizer application implement, a planter, a seeder, and said left and right toolbars and said stacking left and right wing toolbars are configured to support a plurality of row units.

* * * * *